US012014715B2

(12) United States Patent
Reid et al.

(10) Patent No.: US 12,014,715 B2

(45) **Date of Patent: *Jun. 18, 2024**

(54) NOISE CONTROL

(71) Applicant: Dyson Technology Limited, Wiltshire (GB)

(72) Inventors: Peter Knight Reid, Swindon (GB); Philip Stephen Darling, Bristol (GB)

(73) Assignee: Dyson Technology Limited, Wiltshire (GB)

(*) Notice: Subject to any disclaimer, the term of this patent is extended or adjusted under 35 U.S.C. 154(b) by 223 days.

This patent is subject to a terminal disclaimer.

(21) Appl. No.: 17/440,735

(22) PCT Filed: Feb. 25, 2020

(86) PCT No.: PCT/GB2020/050441

§ 371 (c)(1),
(2) Date: Sep. 17, 2021

(87) PCT Pub. No.: WO2020/193937

PCT Pub. Date: Oct. 1, 2020

(65) Prior Publication Data

US 2022/0180850 A1 Jun. 9, 2022

(30) Foreign Application Priority Data

Mar. 22, 2019 (GB) ..................................... 1903969

(51) Int. Cl.
*G10K 11/178* (2006.01)
*A62B 18/00* (2006.01)
(Continued)

(52) U.S. Cl.
CPC ...... *G10K 11/17823* (2018.01); *A62B 18/003* (2013.01); *A62B 18/006* (2013.01);
(Continued)

(58) Field of Classification Search
CPC ..... G10K 2210/121; G10K 2210/1081; H04R 1/1083; H04R 2460/01
See application file for complete search history.

(56) References Cited

U.S. PATENT DOCUMENTS 8,447,045 B1 5/2013 Laroche
2003/0188743 A1 10/2003 Manne
(Continued)

FOREIGN PATENT DOCUMENTS

CN 201292994 Y 8/2009
CN 102473407 A 5/2012
(Continued)

OTHER PUBLICATIONS

Machine translation of DE 10 2017 129 469, 6 pages. (Year: 2019).*
(Continued)

*Primary Examiner* — Ping Lee
(74) *Attorney, Agent, or Firm* — Tucker Ellis LLP

(57) ABSTRACT

There is provided an ear cup including a housing containing a filter assembly and a motor-driven impeller for creating an airflow through the filter assembly, the housing including an air outlet downstream from the filter assembly for emitting the filtered airflow from the housing. The ear cup further includes an acoustic driver carried by or mounted to, either directly or indirectly, the housing, a reference internal noise sensor disposed within the housing, and a reference ambient noise sensor carried by or mounted to, either directly or indirectly, the housing. The ear cup further includes active noise control circuitry that is configured, in a first operating state, to use a signal provided by the reference internal noise sensor to operate the acoustic driver and, in a second operating state, to use a signal provided by the reference ambient noise sensor to operate the acoustic driver.

20 Claims, 10 Drawing Sheets

(51) Int. Cl.

| | |
|---|---|
| ***A62B 18/08*** | (2006.01) |
| ***H04R 1/10*** | (2006.01) |

(52) U.S. Cl.

CPC ........ *A62B 18/08* (2013.01); *G10K 11/17857* (2018.01); *G10K 11/17881* (2018.01); *H04R 1/1008* (2013.01); *H04R 1/105* (2013.01); *H04R 1/1083* (2013.01); *G10K 11/17854* (2018.01); *G10K 2210/1081* (2013.01); *G10K 2210/121* (2013.01); *G10K 2210/3026* (2013.01); *G10K 2210/3027* (2013.01); *G10K 2210/3028* (2013.01); *G10K 2210/3044* (2013.01); *H04R 2460/01* (2013.01)

(56) References Cited

U.S. PATENT DOCUMENTS

| | | | | |
|---|---|---|---|---|
| 2004/0194776 | A1 | 10/2004 | Amir | |
| 2004/0264706 | A1 | 12/2004 | Ray et al. | |
| 2005/0249355 | A1 | 11/2005 | Chen et al. | |
| 2010/0272283 | A1 | 10/2010 | Carreras et al. | |
| 2011/0044464 | A1 | 2/2011 | Sapiejewski et al. | |
| 2014/0051483 | A1 | 2/2014 | Schoerkmaier | |
| 2014/0086425 | A1 | 3/2014 | Jensen et al. | |
| 2014/0126734 | A1* | 5/2014 | Gauger, Jr. ...... | G10K 11/17853 381/71.6 |
| 2014/0126735 | A1 | 5/2014 | Gauger, Jr. | |
| 2015/0296297 | A1 | 10/2015 | Hua et al. | |
| 2019/0069074 | A1 | 2/2019 | Yamkovoy | |
| 2022/0148557 | A1 | 5/2022 | Reid et al. | |
| 2022/0180851 | A1 | 6/2022 | Reid et al. | |
| 2022/0182749 | A1 | 6/2022 | Reid et al. | |

FOREIGN PATENT DOCUMENTS

| | | | |
|---|---|---|---|
| CN | 103052851 | A | 4/2013 |
| CN | 103949017 | A | 7/2014 |
| CN | 103961822 | A | 8/2014 |
| CN | 103994485 | A | 8/2014 |
| CN | 203775388 | U | 8/2014 |
| CN | 203852759 | U | 10/2014 |
| CN | 203898976 | U | 10/2014 |
| CN | 105120391 | A | 12/2015 |
| CN | 105571010 | A | 5/2016 |
| CN | 105999576 | A | 10/2016 |
| CN | 106454576 | A | 2/2017 |
| CN | 206713019 | U | 12/2017 |
| CN | 206922999 | U | 1/2018 |
| CN | 107750026 | A | 3/2018 |
| CN | 107750028 | A | 3/2018 |
| CN | 108696785 | A | 10/2018 |
| CN | 207968819 | U | 10/2018 |
| CN | 208536174 | U | 2/2019 |
| CN | 211860491 | U | 11/2020 |
| CN | 212411572 | U | 1/2021 |
| CN | 212413389 | U | 1/2021 |
| CN | 212413390 | U | 1/2021 |
| DE | 102017129469 | | 6/2019 |
| EP | 1074971 | | 2/2001 |
| EP | 2594853 | A1 | 5/2013 |
| EP | 2602566 | A1 | 6/2013 |
| GB | 2434708 | A | 8/2007 |
| GB | 2441835 | | 3/2008 |
| GB | 2487125 | | 7/2012 |
| JP | 01-251214 | A | 10/1989 |
| JP | 2016-061534 | A | 4/2016 |
| JP | 2022-528484 | A | 6/2022 |
| JP | 2022-528624 | A | 6/2022 |
| JP | 2022-529101 | A | 6/2022 |
| KR | 10-2009-0035888 | A | 4/2009 |
| KR | 10-2009-0115450 | A | 11/2009 |
| KR | 10-1796969 | B1 | 11/2017 |
| KR | 10-1889372 | B1 | 8/2018 |
| KR | 20-0488413 | Y1 | 1/2019 |
| WO | 2009/134107 | A2 | 11/2009 |
| WO | 2013/082650 | | 6/2013 |
| WO | 2016/047069 | | 3/2016 |
| WO | 2017/120992 | A1 | 7/2017 |
| WO | 2019/050849 | A1 | 3/2019 |
| WO | 2020/193936 | A1 | 10/2020 |
| WO | 2020/193937 | A1 | 10/2020 |
| WO | 2020/193938 | A1 | 10/2020 |

OTHER PUBLICATIONS

Office Action received for Chinese Patent Application No. 202010198931.2, mailed on Jun. 15, 2022, 18 pages (10 pages of English Translation and 8 pages of Original Document).

Office Action received for Chinese Patent Application No. 202010198997.1, mailed on Jun. 15, 2022, 22 pages (12 pages of English Translation and 10 pages of Original Document).

Office Action received for Japanese Patent Application No. 2021-556860, mailed on Nov. 22, 2022, 7 pages (4 pages of English Translation and 3 pages of Original Document).

Office Action received for Korean Patent Application No. 10-2021-7033884, mailed on May 17, 2023, 19 pages (10 pages of English Translation and 09 pages of Original Document).

Office Action received for Korean Patent Application No. 10-2021-7034206, mailed on May 17, 2023, 22 pages (11 pages of English Translation and 11 pages of Original Document).

Office Action received for Korean Patent Application No. 10-2021-7034207, mailed on Jun. 21, 2023, 16 pages (7 pages of English Translation and 9 pages of Original Document).

Office Action received for Japanese Patent Application No. 2021-556871, mailed on Nov. 22, 2022, 6 pages (3 pages of English Translation and 3 pages of Original Document).

Evaluation Report dated Mar. 19, 2021, directed to CN Application No. ZL2020201409149; 9 pages.

Evaluation Report received for CN Application No. 202020367425.7, mailed on Dec. 14, 2020, 5 pages (Original Document Only).

Evaluation Report received for CN Application No. 202020367431.2, mailed on Jul. 23, 2021, 4 pages (Original Document Only).

GB Search Report received for GB App. No. 1903969, mailed on Jun. 3, 2019, 2 pages.

GB Search Report received for GB Application No. 1903971, mailed on May 29, 2019, 2 pages.

International Search Report and Written Opinion received for PCT Patent Application No. PCT/GB2019/053575, mailed on Mar. 5, 2020, 8 pages.

International Search Report and Written Opinion received for PCT Patent Application No. PCT/GB2020/050441, mailed on May 19, 2020, 11 pages.

International Search Report and Written Opinion received for PCT Patent Application No. PCT/GB2020/050442, mailed on May 20, 2020, 12 pages.

Office Action received for CN Application No. 202020367425.7, mailed on Apr. 20, 2021, 3 pages (Original Document Only).

Search Report dated Apr. 15, 2019, directed to GB Application No. 1901349.9; 2 pages.

International Search Report and Written Opinion received for PCT Patent Application No. PCT/GB2020/050440, mailed on May 14, 2020, 12 pages.

Office Action received for Chinese Patent Application No. 202010198915.3, mailed on Apr. 26, 2022, 24 pages (12 pages of English Translation and 12 pages of Original Document).

Office Action received for Korean Patent Application No. 10-2021-7024039, mailed on Oct. 20, 2023, 17 pages (8 pages of English Translation and 9 pages of Original Document).

Office Action received for Japanese Patent Application No. 2021-556860, mailed on Jul. 4, 2023, 8 pages (5 pages of English Translation and 3 pages of Original Document).

Office Action received for Chinese Patent Application No. 202010069293.4, mailed on Dec. 6, 2023, 28 pages (16 pages of English Translation and 12 pages of Original Document).

* cited by examiner

NOISE CONTROL

CROSS REFERENCE TO RELATED APPLICATIONS

This application is a National Stage entry of International Application No. PCT/GB2020/050441 filed Feb. 25, 2020, which claims benefit of United Kingdom Patent Application No. 1903969.2 filed Mar. 22, 2019, both of which are herein incorporated by reference in their entirety.

FIELD OF THE INVENTION

The present invention relates to noise control in an ear cup or speaker assembly, and specifically relates to an implementation of active noise control within the ear cup of a head wearable device.

BACKGROUND OF THE INVENTION

Air pollution is an increasing problem and a variety of air pollutants have known or suspected harmful effects on human health. The adverse effects that can be caused by air pollution depend upon the pollutant type and concentration, and the length exposure to the polluted air. For example, high air pollution levels can cause immediate health problems such as aggravated cardiovascular and respiratory illness, whereas long-term exposure to polluted air can have permanent health effects such as loss of lung capacity and decreased lung function, and the development of diseases such as asthma, bronchitis, emphysema, and possibly cancer.

In locations with particularly high levels of air pollution, many individuals have recognised the benefits of minimising their exposure to these pollutants and have therefore taken to wearing face masks with the aim of filtering out at least a portion of the pollutants present in the air before it reaches the mouth and nose. These face masks range from basic dust masks that merely filter out relatively large dust particles, to more complex air-purifying respirators that require that the air pass through a filter element or cartridge. However, as these face masks typically cover at least the users mouth and nose they can make normal breathing more laborious and can also cause problems with the user's ability to speak to others, such that there is some reluctance to make use of such face masks on a day-to-day basis despite the potential benefits.

As a consequence, there have been various attempts to develop air purifiers that can be worn by the user but that do not require the user's mouth and nose to be covered. For example, there are various designs for wearable air purifiers that are worn around the neck of the user and that create a jet of air that is directed upwards towards the user's mouth and nose. Whilst these may be more socially acceptable, they are generally less effective at limiting the user's exposure to airborne pollutants than some of the best performing face-worn filters. This is largely due to the lack of accuracy with which they deliver the jet of air to the user's mouth and nose and to the fact that flows of unfiltered air that can still reach the user's mouth and nose.

WO2017120992, CN103949017A, KR101796969B1 and CN203852759U all describe head-worn purifiers that provide an alternative to both face masks and neck-worn purifiers. WO2017120992 describes a system in which a separate air filtering unit is connected by a pipe to an air outlet provided on an arm that extends from one of the earphones. Each of CN103949017A, KR101796969B1 and CN203852759U then describe headsets in which both a fan and a filter are incorporated into at least one of the ear cups. Of these, only KR101796969B1 considers implementing active noise control (ANC) to reduce the noise generated by the air supply unit. Specifically, KR101796969B1 states that the ear cup is provided with a frequency generator that generates a frequency for cancelling the noise of the air supply unit, and that this can be achieved using conventional techniques for noise reduction. However, contrary to this assertion, implementing active noise control to attenuate noise generated by a fan located within an ear cup is not straightforward.

Active noise control uses destructive interference to attenuate noise. The frequency, amplitude and phase of any undesired sound are identified and another sound of the same frequency and amplitude but opposite phase is created, i.e. an 'anti-noise' sound, with the intention that this 'anti-noise' sound will cancel out the noise. Within a headset, the anti-noise signal is combined with the desired audio signal before being output by the audio transducer.

Active noise control can be implemented using any of a feedforward, a feedback or a hybrid system. In a feedforward system, a reference noise microphone (typically referred to as a feedforward microphone) is located at a reference positon that is close to the exterior of the headset in order to measure the noise from the environment and provide a reference noise signal based on the measured ambient noise as an input to a feedforward ANC filter. The feedforward ANC filter then uses the reference noise signal from the reference noise microphone to generate an anti-noise signal that aims to attenuate the measured ambient noise. In a feedback system, an error noise microphone (typically referred to as an error noise sensor) is located close to the user's ear, typically adjacent to the acoustic transducer, to measure the sounds that are heard by the user and provides an error noise signal based on the measured sound as an input to a feedback ANC filter. The feedback ANC filter then compares the input from the error noise sensor with desired audio source to identify unwanted noise and generates an anti-noise signal with the aim of attenuating the identified noise. A hybrid system then combines both a feedforward system and a feedback system to improve the overall noise cancellation performance. In a basic hybrid system, the feedforward system and the feedback system independently generate separate anti-noise signals based on the inputs from their corresponding microphones. These separate anti-noise signals are then combined with the desired audio signal before being output by the audio transducer. In advanced hybrid systems the feedforward system and the feedback system do not function entirely independently of one another, as the noise identified by the feedback system is used to improve the performance of the feedforward ANC filter (i.e. is used as an input for determining the coefficients of the feedforward ANC filter).

In conventional headsets active noise control is only required to cancel noise that is generated externally. However, in a head-worn purifier in which a fan is located within an ear cup, noise will also be produced internally by the motor that drives the fan and by the rush of air entering the headset. Conventionally configured ANC systems cannot attenuate both the external environmental (i.e. exogenous) noise and the internally originating (i.e. endogenous) noise.

SUMMARY OF THE INVENTION

It is an object of the present invention to provide an ear cup, and a head wearable device comprising the ear cup, that provides improved active noise control for attenuating both external environmental (i.e. exogenous) noise and internally originating (i.e. endogenous) noise.

According to a first aspect of the present invention there is provided an ear cup comprising a housing containing a filter assembly and a motor-driven impeller for creating an airflow through the filter assembly, the housing comprising an air outlet downstream from the filter assembly for emitting the filtered airflow from the housing. The ear cup further comprises an acoustic driver carried by or mounted to, either directly or indirectly, the housing, a reference internal noise sensor disposed within the housing, and a reference ambient noise sensor carried by or mounted to, either directly or indirectly, the housing. The ear cup further comprises active noise control circuitry that is configured, in a first operating state, to use a signal provided by the reference internal noise sensor to operate the acoustic driver and, in a second operating state, to use a signal provided by the reference ambient noise sensor to operate the acoustic driver. The active noise control circuitry that configured such that, in the first operating state, it does not use the signal provided by the reference ambient noise sensor to operate the acoustic driver and, in the second operating state, it does not use the signal provided by the reference internal noise sensor to operate the acoustic driver.

The reference internal noise may be acoustically coupled to an environment external to the housing. Both the reference internal noise sensor and the reference ambient noise sensor are arranged to detect/measure noise and to output a signal that is indicative of the detected/measured noise. The reference internal noise sensor may comprise a reference internal noise microphone. The reference ambient noise sensor may comprise a reference ambient noise microphone.

The ear cup may be configured as any of a circumaural ear cup and a supra-aural ear cup, and is preferably configured as a circumaural ear cup.

The active noise control circuitry may be configured to select the first operating state in response to receipt of a first control signal and to select the second operating state in response to a second control signal.

The ear cup may further comprise motor control circuitry that is arranged to control a rotational speed of the motor-driven impeller. The motor control circuitry may be configured to send the first control signal to the active noise control circuitry when the rotational speed of the motor-driven impeller is above a threshold. The motor control circuitry may be configured to send the second control signal to the active noise control circuitry when the rotational speed of the motor-driven impeller is below a threshold.

The reference internal noise sensor may be disposed between the motor-driven impeller and the acoustic driver. The ear cup may further comprise a motor arranged to drive the impeller. The impeller and the motor may be disposed within an impeller casing, and the impeller casing may be disposed within the housing. The impeller casing may be suspended/supported within the housing by a plurality of resilient supports. The reference internal noise sensor may be disposed between the impeller casing and the acoustic driver.

The ear cup may further comprise an ear pad attached to the housing and arranged such that the housing and the ear pad together define a cavity having an opening. The acoustic driver may be acoustically coupled to the cavity. The acoustic driver may be at least partially exposed to the cavity. The acoustic driver may be disposed within or adjacent to the cavity. The ear cup may further comprise an error noise sensor that is acoustically coupled to the cavity, and the active noise control circuitry may then be further configured to use a signal provided by the error noise sensor to operate the acoustic driver. The active noise control circuitry may then be further configured to simultaneously use the signal provided by the error noise sensor and one or other of the signal provided by the reference internal noise sensor and the reference ambient noise sensor to operate the acoustic driver.

The error noise sensor may be at least partially exposed to the cavity, and is preferably disposed within or adjacent to the cavity. The error noise sensor may comprise an error noise microphone.

According to a second aspect there is provided a head wearable device comprising a headgear and an ear cup according to the first aspect, wherein the ear cup is attached to the headgear and is arranged to be worn over an ear of a user. The head wearable device may further comprise a further ear cup arranged to be worn over a further ear of the user. The further ear cup may be an ear cup according to the first aspect.

The headgear may comprise a headband arranged to be worn on the head of a user, and the ear cup may then be mounted on a first end of the headband and the further ear cup mounted on an opposite, second end of the headband.

According to a third aspect there is provided a head wearable air purifier comprising a first speaker assembly arranged to be worn over a first ear of a user and a second speaker assembly arranged to be worn over a second ear of the user, wherein the first speaker assembly comprises an ear cup according to the first aspect. The second speaker assembly may comprise an ear cup according to the first aspect.

The head wearable air purifier may further comprise a headgear, and wherein both the first speaker assembly and the second speaker assembly are attached to the headgear. The headgear may comprise a headband arranged to be worn on the head of a user.

The present inventors have found that, whilst a feedback ANC system can provide almost the same level of attenuation for internally originating noise arising from a motor within the ear cup as it does externally originating noise, a conventional feedforward ANC system does not achieve any further attenuation of such an internally originating noise. In a conventional feedforward ANC system, an outwardly facing reference ambient noise sensor (typically a feedforward microphone) is located close to the exterior of the headset to directly measure the noise from the environment and provides this measurement as an input to a feedforward ANC filter. To improve the attenuation of this additional endogenous noise the present inventors propose using an inner feedforward ANC system that is configured to attenuate noise based on an input from a reference internal noise sensor that is arranged to detect sound originating within the housing and that is preferably disposed between the motor and the speaker driver so as to optimally detect the endogenous noise.

This inner feedforward ANC system can be used as part of a hybrid ANC system by combining it with a conventional feedback ANC system. Also, this inner feedforward ANC system can be combined with a conventional (or "outer") feedforward ANC system to optimise the attenuation of both the endogenous noise and the exogenous noise by the feedforward ANC. For optimal performance, the inner feedforward ANC system would be combined with a conventional outer feedforward ANC system in such a way that both systems would operate simultaneously. However, this optimal approach requires significant modifications of conventional ANC circuitry, especially when these are also combined with a feedback ANC system. As a compromise between performance and complexity, the inner feedforward ANC system can be combined with a conventional outer feedforward ANC system in such a way that only the inner feedforward ANC system is functional when motor is generating a sufficient level of noise to require attenuation, and only the conventional outer feedforward ANC system is functional when the motor noise is below this threshold level. Switching between an inner feedforward ANC system and a conventional outer feedforward ANC system in this way provides for improved attenuation of the endogenous noise when this is likely to be the most significant portion of the total noise whilst also optimising the attenuation of the exogenous noise when this is not the case.

BRIEF DESCRIPTION OF THE INVENTION

An embodiment of the present invention will now be described, by way of example only, with reference to the accompanying drawings, in which:

FIG. 1*a* is a front perspective view of an embodiment of a head wearable device as described herein;

FIG. 1*b* is a front view of the head wearable device of FIG. 1*a;*

FIG. 2*a* is a side view of an ear cup of the head wearable device of FIG. 1*a;*

FIG. 2*b* is a perspective view of the ear cup of FIG. 2*a;*

FIG. 3*a* is a cross-sectional view through the ear cup of FIG. 2*a;*

FIG. 3*b* is a further cross-sectional view through the ear cup of FIG. 2*a;*

FIG. 4*a* is a schematic illustration of an example of ANC circuitry suitable for use with the arrangements described herein;

FIG. 4*b* is a schematic illustration of an alternative example of ANC circuitry suitable for use with the arrangements described herein;

DETAILED DESCRIPTION OF THE INVENTION

Figure 1A:
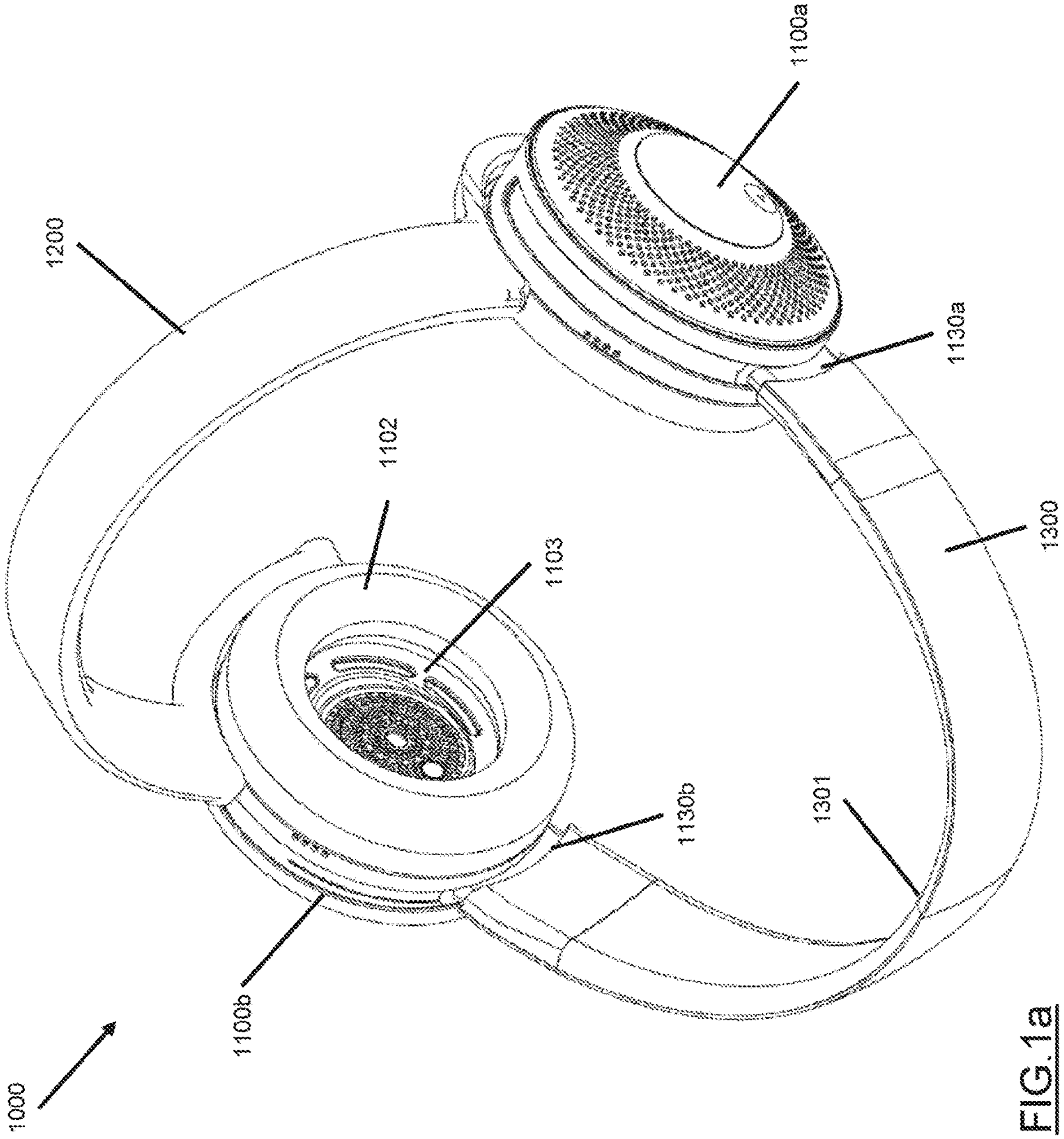

There will now be described an ear cup, and a head wearable air purifier comprising the ear cup, that provides improved active noise control for attenuating both external environmental (i.e. exogenous) noise and internally originating (i.e. endogenous) noise. The term "air purifier" as used herein refers to a device or system capable of removing contaminants from air and emitting a supply of purified or filtered air. The term "head wearable" is used herein to define an item as being capable of or suitable for being worn on the head of a user. In a preferred arrangement, the head wearable air purifier comprises a headphone system comprising a pair of speaker assemblies mounted on a headband in which one or both of the speaker assemblies comprises an ear cup as described herein.

The term "headphones" as used herein refers to a pair of small loudspeakers, or speakers, joined by a headband that is designed to be worn on or around the head of a user. Typically, the speakers are provided by electroacoustic transducers that convert an electrical signal to a corresponding sound. Circumaural headphones, often referred to as full-size or over-ear headphones, have ear pads whose shape is that of a closed loop (e.g. circular, elliptical etc.) so that they encompass the entire ear. Because these headphones completely surround the ear, circumaural headphones can be designed to fully seal against the head to attenuate external noise. Supra-aural headphones, often referred to as on-ear headphones, have ear pads that press against the ears, rather than around them. This type of headphone generally tends to be smaller and lighter than circumaural headphones, resulting in less attenuation of outside noise.

The ear cup comprises an acoustic driver, a filter assembly, a motor-driven impeller for creating an airflow through the filter assembly and an air outlet downstream from the filter assembly for emitting the filtered airflow from the ear cup. The ear cup then further comprises an reference internal noise sensor that is disposed within the ear cup and active noise control (ANC) circuitry that is configured to use a signal provided by the reference internal noise sensor to operate the acoustic driver. Specifically, the reference internal noise sensor is arranged to detect/measure sound originating within the housing and to output a signal that is indicative of the detected/measured sound. The ANC circuitry is then configured to use the signal provided by the reference internal noise sensor to operate the acoustic driver to attenuate this noise. In contrast with a conventional feedforward ANC system, the reference internal noise sensor is preferably disposed between the motor-driven impeller and the acoustic driver so as to optimally detect the endogenous noise generated by the motor-driven impeller. The reference internal noise sensor maybe either a microphone that is configured to detect sound or a vibration sensor (e.g. an accelerometer) that is configured to detect mechanical vibration.

Figure 1B:
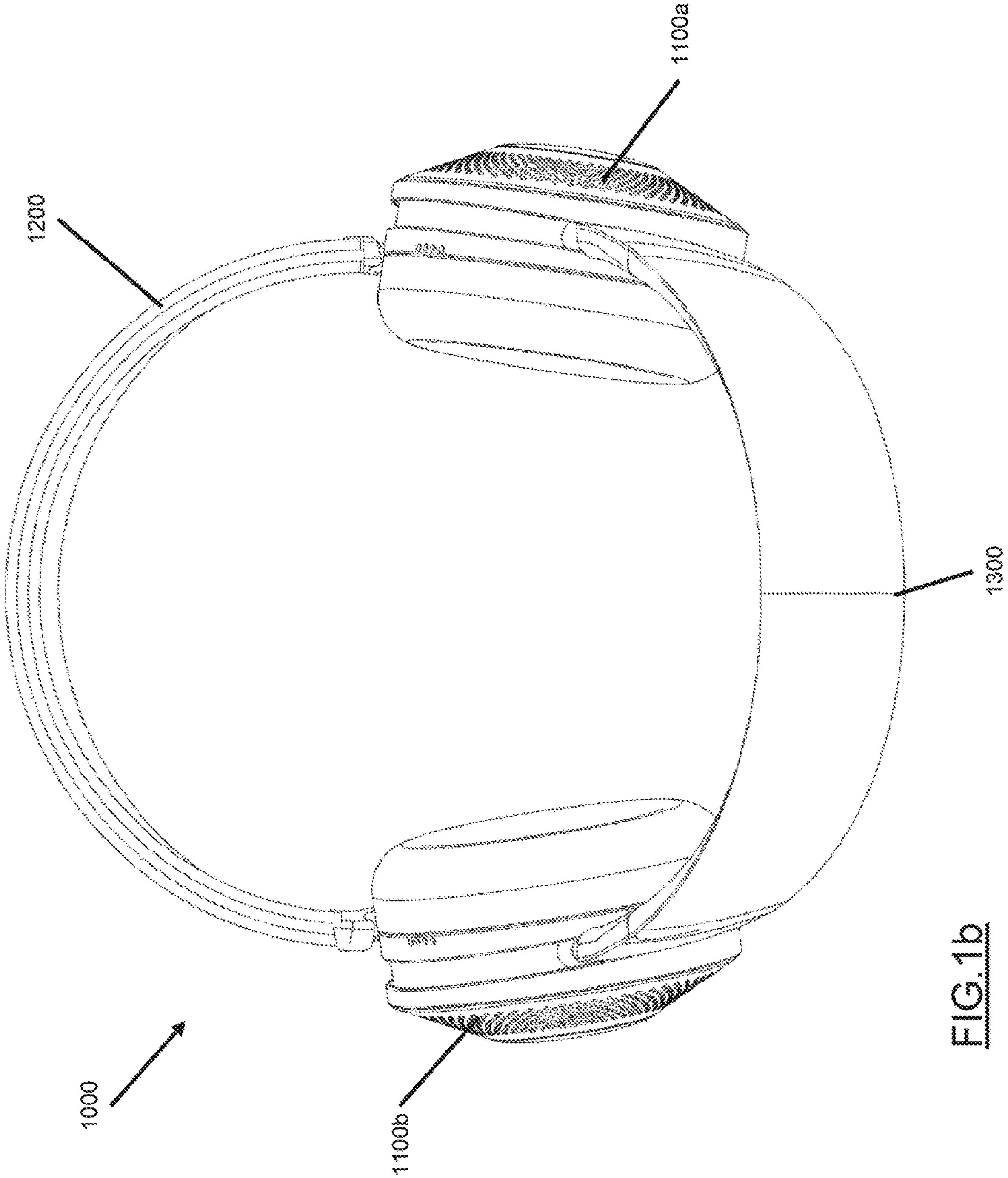
Figure 2A:
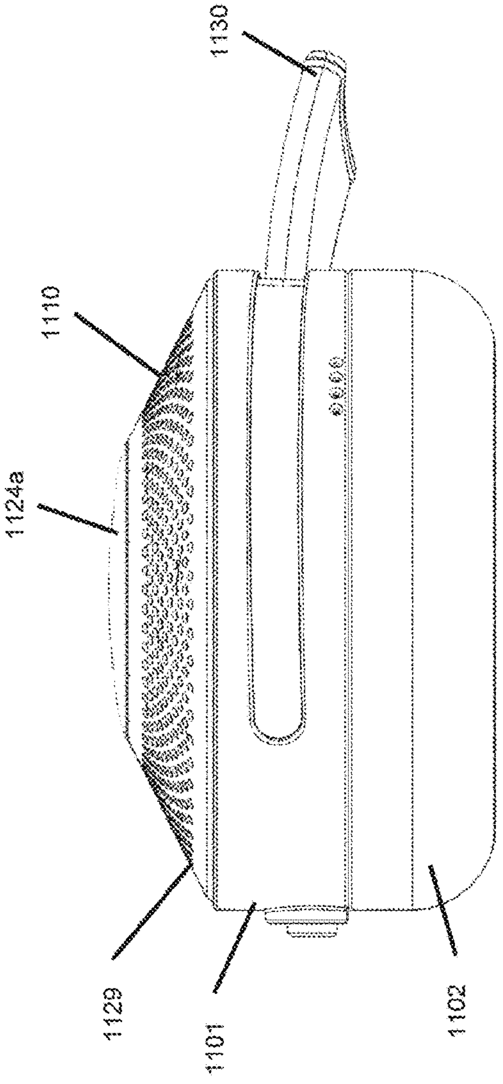
Figure 2B:
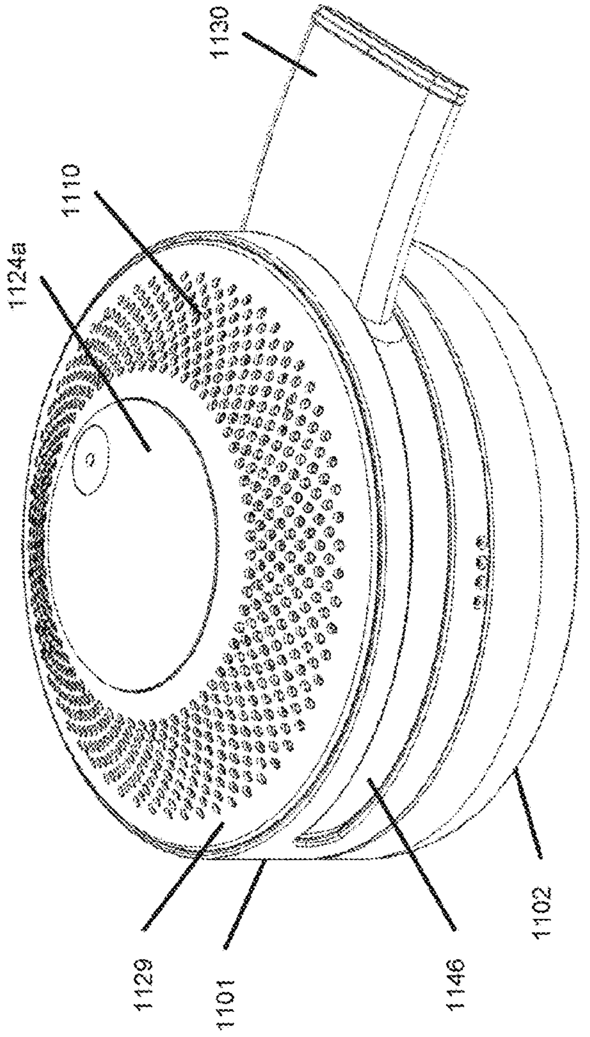
Figure 3A:
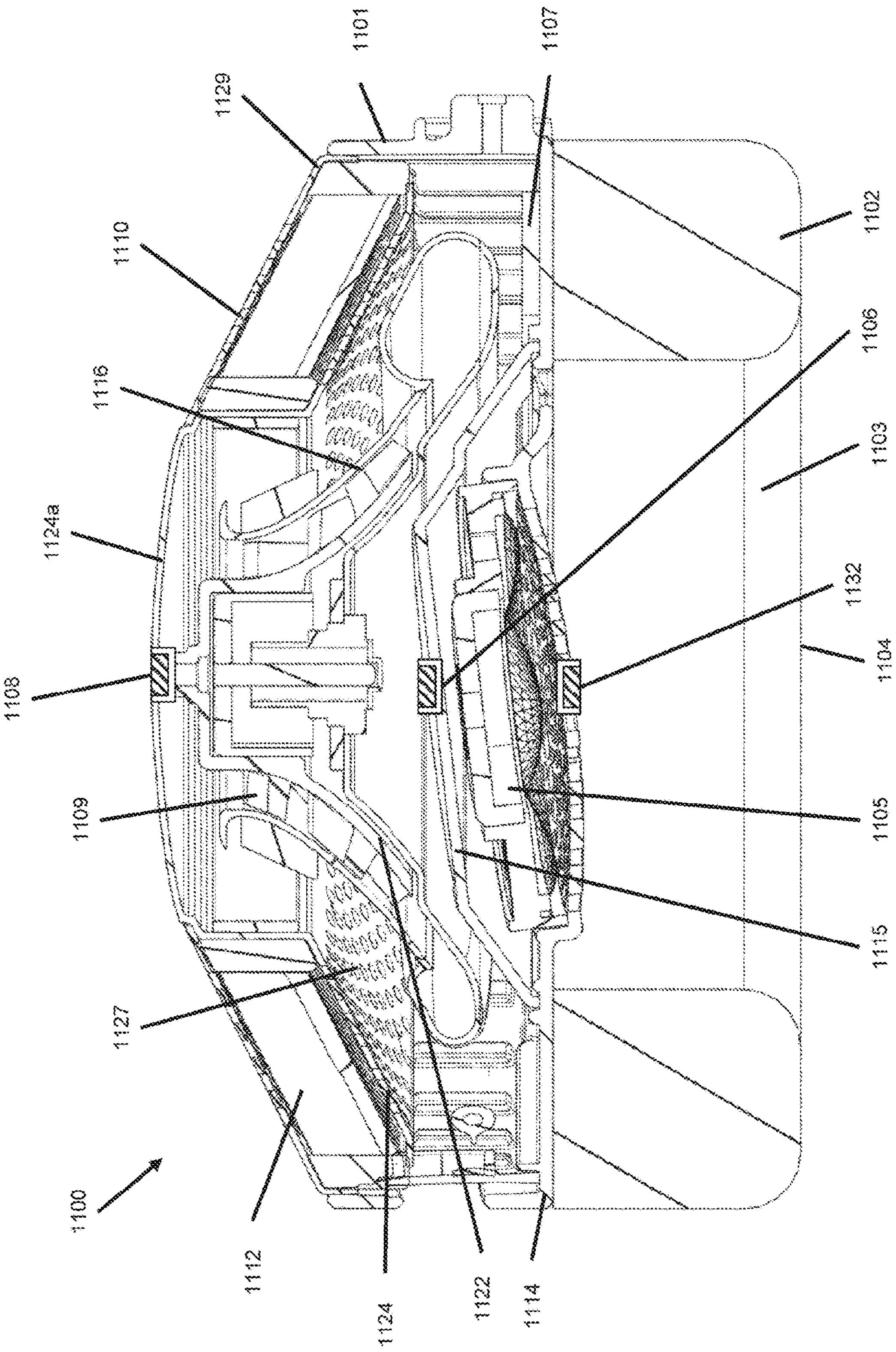
Figure 3B:
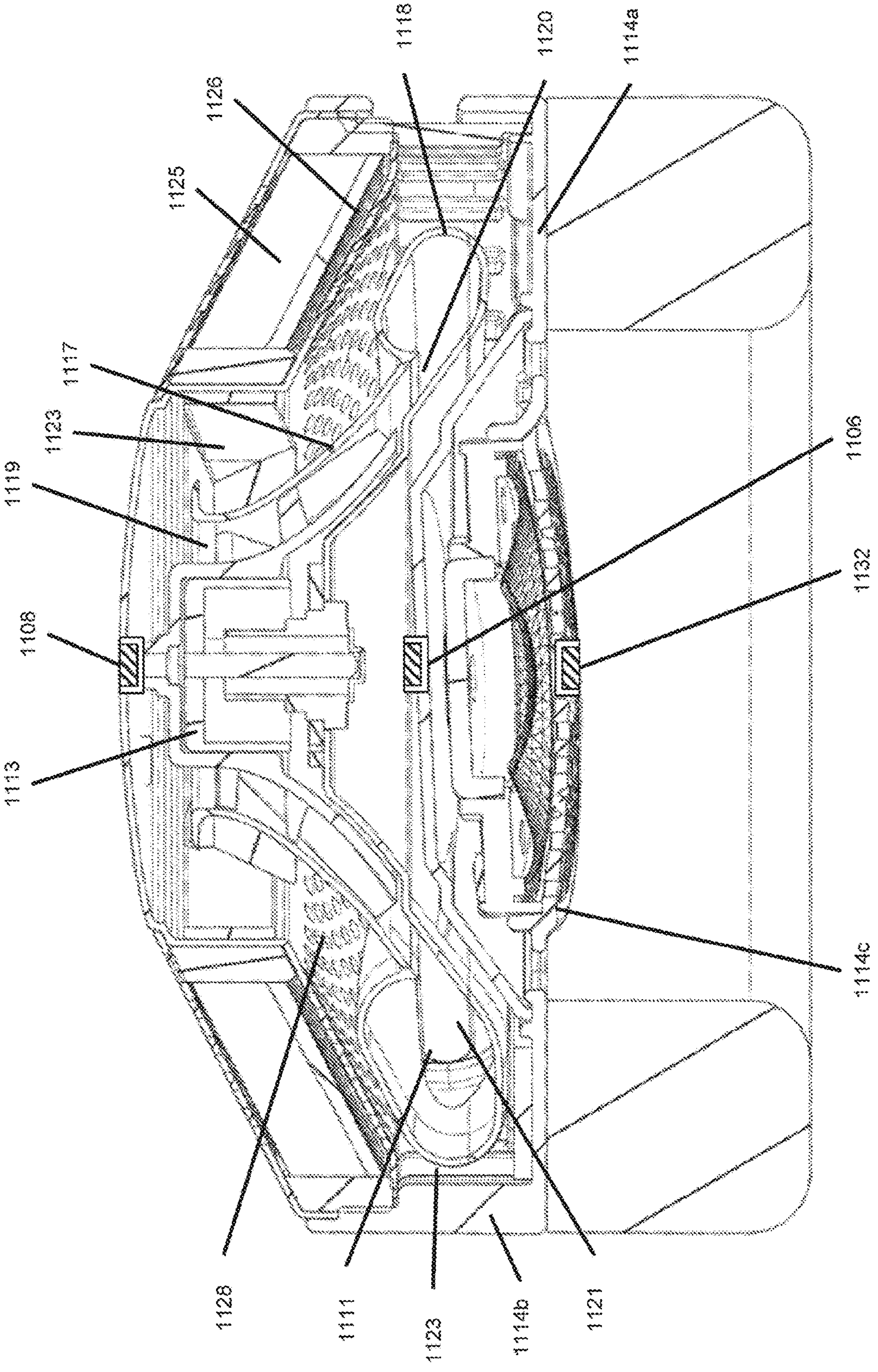

FIGS. 1*a* and 1*b* are external views of an embodiment of a head wearable air purifier 1000. The head wearable air purifier 1000 comprises a pair of generally cylindrical ear cups or speaker assemblies 1100*a*, 1100*b* connected by an arcuate headband 1200, and a nozzle 1300 that extends between and is connected at opposite ends to both ear cups 1100*a*, 1100*b*. FIG. 2*a* then shows a side view of an ear cup 1100 of the air purifier 1000 of FIGS. 1*a* and 1*b*, whilst FIG. 2*b* shows a perspective view of an ear cup 1100 of the air purifier 1000 of FIGS. 1*a* and 1*b*. FIGS. 3*a* and 3*b* are then alternative cross-sectional views through the ear cup 1100 of FIG. 2*a*.

Each of the ear cups 1100*a*, 1100*b* comprises a housing 1101 and an ear pad 1102 attached to the housing 1101, with the housing 1101 and the ear pad 1102 together defining a cavity 1103 having an opening 1104. A speaker or acoustic driver unit 1105 is then attached to the housing 1101 such that is at least partially exposed to the cavity 1103.

Each of the ear cups 1100 then further comprises a motor-driven impeller 1109 disposed within the housing 1101 that is arranged to create an airflow through the housing 1101. The housing 1101 is therefore provided with an air inlet 1110 through which an airflow can be drawn into the housing 1101 by the motor-driven impeller 1109 and an air outlet 1111 for emitting the airflow from the housing 1101. A filter assembly 1112 is also disposed within the housing 1101 such that the airflow generated by the motor-driven impeller 1109 passes through the filter assembly 1112 and such that the airflow emitted from the ear cup 1100 is filtered/purified by the filter assembly 1112. The filter assembly 1112 is therefore located downstream (i.e. relative to the airflow generated by the impeller 1109) of the air inlet 1110 of the housing 1101 and upstream of the air outlet 1111. In the illustrated embodiment, the filter assembly 1112 is also located upstream relative to the motor-driven impeller 1109.

In the illustrated embodiment, the housing 1101 comprises a speaker chassis 1114 upon which the acoustic driver unit 1105 is mounted and a generally frusto-conical speaker cover 1115 mounted on the speaker chassis 1114 over the acoustic driver unit 1105. The speaker chassis 1114 comprises a generally circular base 1114*a* that is surrounded by a cylindrical side wall 1114*b*. The air outlet 1111 of the housing is then defined by an aperture formed in the cylindrical side wall 1114*b*. The ear cup 1100 is also provided with a hollow, rigid outlet duct 1130 that extends from the housing 1101 and that is arranged to connect the air outlet 1111 of the ear cup 1100 to an air inlet of the nozzle 1300.

A central portion of the speaker chassis provides a driver support plate 1114*c* upon which the acoustic driver unit 1105 can be located. The generally frusto-conical speaker cover 1115 is then mounted on the speaker chassis 1114 over the entirety of the driver support plate 1114*c* such that the acoustic driver unit 1105 is covered by the speaker cover 1115. The driver support plate 1114*c* of the speaker chassis 1114 is provided with an array of apertures for allowing sound generated by the acoustic driver unit 1105 to pass through the speaker chassis 1114 into the cavity 1103 enclosed by ear pad 1102. In addition, the driver support plate 1114*c* is angled or tilted relative to the peripheral portion of the base 1114*a* of the speaker chassis 1114. The angle or tilt of the driver support plate 1114*c* is chosen so that the acoustic driver unit 1105 is substantially parallel with the ears when the head wearable air purifier 1000 is worn on the head of a user with the ear cup 1100 over the user's ear. For example, in the illustrated embodiment, the angle of the driver support plate 1114*c* relative to the peripheral portion of the base 1114*a* is from 10 to 15 degrees.

Each of the ear cups 1100 also comprises one or more circuit boards 1107 upon which various electronic circuitry is disposed or mounted. For example, this electronic circuitry may comprise motor control circuitry that is arranged to control a rotational speed of a motor 1113 that drives the impeller 1109, audio control circuitry that is arranged to control the audio playback and ANC circuitry that is arranged to implement active noise control to attenuate unwanted noise. In the illustrated embodiment, the one or more circuit boards 1107 are disposed on or mounted to the peripheral portion of the speaker chassis 1114. The circuit board 1107 therefore at least partially encircles the acoustic driver unit 1105 (i.e. is disposed outside/around a periphery of the acoustic driver unit 1105) when the acoustic driver unit 1105 is mounted on to the driver support plate 1114*c*.

A generally frusto-conical impeller casing 1116 containing both the impeller 1109 and the motor 1113 is then disposed over the speaker cover 1115 so that acoustic driver unit 1105 is nested within a recess or cavity defined by a back/rear of the impeller casing 1116. This impeller casing 1116 comprises a generally frusto-conical impeller housing 1117 surrounding the impeller 1109 and the motor 1113, and an annular volute 1118 fluidically connected to a base of the impeller housing 1117 and that is arranged to receive the air exhausted from the impeller housing 1117. The impeller housing 1117 is provided with an air inlet 1119 through which air can be drawn by the impeller 1109 and an air outlet 1120 through which the air is emitted from the impeller housing 1117 into the annular volute 1118. The air inlet 1119 of the impeller housing 1117 is provided by an aperture/opening at the small diameter end of the impeller housing 1117 and the air outlet 1120 is provided by an annular slot formed around a large diameter end or base of the impeller housing 1117.

The annular volute 1118 comprises a spiral (i.e. gradually widening) duct that is arranged to receive the air exhausted from the impeller housing 1117 and to guide the air to an air outlet 1121 of the volute 1118. The air outlet 1121 of the volute 1118 is then fluidically connected to the air outlet 1111 of the speaker assembly 1100. The term "volute" as used herein refers to a spiral funnel that receives the fluid being pumped by an impeller and increases in area as it approaches a discharge port. The air outlet 1121 of the volute 1118 therefore provides an efficient and quiet means for collecting the air that is exhausted from the circumferential annular slot that that forms the air outlet 1120 of the impeller housing 1117.

In the illustrated embodiment, the impeller 1109 is a mixed flow impeller that has a generally conical or frusto-conical shape. The impeller 1109 is hollow such that a rear/back side of the impeller 1109 defines a generally frusto-conical recess. The motor 1113 is then nested/disposed within this recess. Preferably, the impeller 1109 is a semi-open/semi-closed mixed flow impeller i.e. having a back shroud 1122 only. The back shroud 1122 of the impeller 1109 then defines the recess within which the motor 1113 is nested/disposed.

The impeller casing 1116 is then supported/suspended within the housing 1101 by a plurality of resilient supports 1123 that reduce the transmission of vibrations from the impeller casing 1116 to the speaker housing 1101. To do so, the plurality of resilient supports 1123 each comprise a resilient material such as an elastomeric or rubber material. In the illustrated embodiment, the only direct connection between the speaker housing 1101 and the impeller casing 1116 is provided by the resilient supports 1123.

The filter assembly 1112 is then mounted to the speaker chassis 1114 so that the filter assembly 1112 is provided upstream of the impeller 1109 and is arranged to be nested over the impeller casing 1116. The filter assembly 1112 comprises a filter seat 1124 supporting one or more filter elements 1125, 1126. In the illustrated embodiment, the filter assembly 1112 comprises both a particulate filter element 1125 and a chemical filter element 1126, with the particulate filter element 1125 located upstream relative to the chemical filter element 1126.

The filter seat 1124 is provided with a plurality of apertures 1127 that allow air to pass from a front surface of the filter seat 1124 to a rear/back surface of the filter seat 1124, with the front surface being arranged to support the filter elements 1125, 1126 over the plurality of apertures 1127. The filter seat 1124 then further defines an air passageway or channel 1128 between the rear/back surface of the filter seat 1124 and the air inlet 1119 of the impeller casing 1116 that is arranged to guide air to the air inlet 1119 of the impeller casing 1116. This air passageway 1128 is provided by a cavity defined between the rear/back surface of the filter seat 1124 and a front surface of the impeller casing 1116. Air must therefore pass through the filter elements 1125, 1126 before it can pass through the apertures 1127 in the filter seat 1124 and into the air passageway 1128 that leads to the air inlet 1119 of the impeller casing 1116.

In the illustrated embodiment, the filter seat 1124 is mounted to the speaker chassis 1114 and located over the impeller housing 1117, with the impeller housing 1117 partially disposed within a volume defined by a back of the filter seat 1124. In particular, the filter seat 1124 comprises a generally frusto-conical peripheral portion and a generally cylindrical central portion. The generally frusto-conical peripheral portion of the filter seat 1124 is provided with the plurality of apertures 1127 and is arranged to support one or more generally frusto-conical filter elements 1125, 1126 over the plurality of apertures 1127. The impeller housing 1117 is then at least partially disposed within the generally cylindrical central portion of the filter seat 1124. In particular, the air inlet 1119 of impeller housing 1117 is disposed within a volume defined by a back of the cylindrical central portion of the filter seat 1124.

The housing 1101 further comprises an outer cover 1129 that is mounted onto the speaker chassis 1114. This outer cover 1129 is arranged to fit over (and therefore generally conforms to) the filter assembly 1112 and is provided with an array of apertures that allow air to pass through the outer cover 1129 and that therefore define an air inlet 1110 of the outer cover 1129. These apertures are sized to prevent larger particles from passing through to the filter assembly 1112 and blocking, or otherwise damaging, the filter elements 1125, 1126. Alternatively, in order to allow air to pass through, the outer cover 1129 could comprise one or more grilles or meshes mounted within windows in the outer cover 1129. It will also be clear that alternative patterns of arrays are envisaged within the scope of the present invention.

The outer cover 1129 is releasably attached to the speaker chassis 1114 so as to cover the filter assembly 1112. For example, the outer cover 1129 could be attached to the speaker chassis 1114 using cooperating screw threads provided on the outer cover 1129 and the speaker chassis 1114 and/or using some catch mechanism. When mounted on speaker chassis 1114, the outer cover 1129 protects the filter elements 1125, 1126 from damage, for example during transit, and also provides a visually appealing outer surface covering the filter assembly 1112, which is in keeping with the overall appearance of the purifier 1000.

In the illustrated embodiment, the outer cover 1129 is provided as a hollow frustacone with open ends. The open large diameter end of the outer cover 1129 is arranged to fit over the periphery of the large diameter end of the filter assembly 1112, whilst the open small diameter end of the outer cover 1129 is arranged fit over both the periphery of the small diameter end of the filter assembly 1112 and the generally cylindrical central portion of the filter seat 1124. A circular front surface 1124*a* of the generally cylindrical central portion of the filter seat 1124 is therefore exposed within the open small diameter end of the outer cover 1129 and thereby forms a portion of the outer surface of the speaker assembly 1100. Preferably, the circular front surface 1124*a* of the filter seat 1124 is transparent and thereby forms a window through which the user to see the spinning of the impeller 1109 through the air inlet 1119 of the impeller casing 1116. This allows the user to visually check the speed of the impeller 1109 and to confirm that the impeller 1109 is functioning appropriately.

As shown in FIG. 1*b*, a first open end of the nozzle 1300 is connected to the rigid outlet duct 1130 that extends from the housing 1101 of the first speaker assembly 1100*a*. The nozzle 1300 then extends away from the first ear cup 1100*a* and assumes an arcuate shape so that the opposite, second open end of the nozzle 1300 connects to the rigid outlet duct 1130 that extends from the speaker housing 1101 of the second ear cup 1100*b*. The nozzle 1300 is arranged such that, when the purifier 1000 is worn by a user with the first ear cup 1100*a* over a first ear of the user and the second ear cup 1100*b* over a second ear of the user, the nozzle 1300 can extend around a face of the user, from one side to the other, and in front of a mouth of the user. In particular, the nozzle 1300 extends around the jaw of the user, from adjacent to one cheek to adjacent the other cheek, without making contact with the mouth, nose or surrounding regions of the user's face. It is therefore preferable that the at least a portion of the nozzle 1300 is formed of a transparent or partially transparent material so that the user's mouth is visible through the nozzle 1300 so as to avoid limiting the user's ability to clearly speak to others. For example, a central portion of the nozzle could be made from a flexible, transparent plastic such as a polyurethane, whilst the two end portions could each made from a stiff, transparent plastic such as a polyethylene terephthalate glycol-modified (PETG). Alternatively, the entire nozzle 1300 could be formed from a single transparent or partially transparent material.

The nozzle 1300 is provided with an air outlet 1301 for emitting/delivering the filtered air to a user. For example, the air outlet 1301 of the nozzle 1300 can comprise an array of apertures formed in a section of the nozzle 1300, with these apertures extending from an interior passage defined by the nozzle 1300 to an exterior surface of the nozzle 1300. Alternatively, the air outlet 1301 of the nozzle 1300 may comprise one or more grilles or meshes mounted within windows in the nozzle 1300.

In use, the purifier 1000 is worn by a user with the first ear cup 1100*a* over a first ear of the user and the second ear cup 1100*b* over a second ear of the user such that the nozzle 1300 can extend around a face of the user, from one ear to the other, and over at least the mouth of the user. Within each ear cup 1100*a*, 1100*b*, the rotation of the impeller 1109 by the motor 1113 will cause an airflow to be generated through the impeller casing 1116 that draws air into the speaker assembly 1100 through the apertures in the outer cover 1129. This flow of air will then pass through the filter elements 1125, 1126 disposed between the outer cover 1129 and the filter seat 1124 thereby filtering and/or purifying the airflow. The resulting filtered airflow will then pass through the apertures 1127 provided in the frustoconical portion of the filter seat 1124 into the air passageway 1128 provided by the space between the impeller casing 1116 and the opposing surface of the filter seat 1124, with the air passageway 1128 then guiding the airflow to the air inlet 1119 of the impeller casing 1116. The impeller 1109 will then force the filtered airflow out through the annular slot that provides the air outlet 1120 of the impeller housing 1117 and into the volute 1118 of the impeller casing 1116. The volute 1118 then guides the filtered airflow through the air outlet 1111 of the speaker assembly 1100, through the rigid outlet duct 1130 that extends from the housing 1101, and into the nozzle 1300 through an air inlet provided by one of the open ends of the nozzle 1300.

Each of the ear cups 1100 also comprise a reference internal noise sensor provided by a microphone that is disposed within the housing 1101, between the motor-driven impeller 1109 and the acoustic driver 1105, so as to optimally detect the endogenous noise generated by the motor-driven impeller 1109. In the illustrated embodiment, the reference internal noise microphone 1106 is mounted to the speaker cover 1115 facing towards the motor-driven impeller 1109 and the back/rear of the impeller casing 1116. Active noise control (ANC) circuitry, provided on the one or more circuit boards 1007, is then connected to the both the reference internal noise microphone 1106 and the acoustic driver 1105. This ANC circuitry is configured to use a signal provided by the reference internal noise microphone 1106 (e.g. a reference internal noise signal) to operate the acoustic driver 1105 to attenuate noise. Specifically, the signal provided by the reference internal noise microphone 1106 is indicative of noise detected by the reference internal noise microphone 1106, and the ANC circuitry comprises an inner feedforward filter that is configured to receive the reference internal noise signal and to generate an output (e.g. an inner feedforward filter output) that causes the acoustic driver 1105 to attenuate this noise.

In addition, each of the ear cups 1100 further comprises an outwardly facing, reference ambient noise sensor provided by a microphone 1108 that is also connected to the ANC circuitry. In contrast to the reference internal noise microphone 1106, the reference ambient noise microphone 1108 is mounted to the housing 1101 such that it is acoustically coupled to the environment external to the housing 1101. In the illustrated embodiment, the reference ambient noise microphone 1108 is provided adjacent to the outer surface of the housing 1101, facing towards the exterior of the ear cup 1100. Specifically, the reference ambient noise microphone 1108 is mounted on the inner surface of the circular front surface 1124*a* of the filter seat 1124. The ANC circuitry is therefore also configured to use a signal provided by the reference ambient noise microphone 1108 (e.g. a reference ambient noise signal) to operate the acoustic driver 1105 to attenuate noise. Specifically, the signal provided by the reference ambient noise microphone 1108 is indicative of noise detected by the reference ambient noise microphone 1108, and the ANC circuitry comprises an outer feedforward filter that is configured to receive the reference ambient noise signal and to generate an output (e.g. an outer feedforward filter output) that causes the acoustic driver 1105 to attenuate this noise.

Each of the ear cups 1100 yet further comprises an error noise sensor provided by a microphone 1132 disposed within the cavity 1103, adjacent to the acoustic driver 1105, in order to acquire the sounds that are reaching the user so that any unwanted noise can be identified. In the illustrated embodiment, the error noise microphone 1132 is mounted on the speaker chassis 1114 between the acoustic driver 1105 and the opening 1104 of the cavity 1103, and faces towards the opening 1104 of the cavity 1103. The ANC circuitry is therefore also configured to use a signal provided by the error noise microphone 1132 (e.g. a feedback signal) to operate the acoustic driver 1105 to attenuate noise. Specifically, the feedback signal provided by the error noise microphone 1132 is indicative of noise detected by the error noise microphone 1132 and the ANC circuitry comprises a feedback filter that is configured to receive both the feedback signal and the desired audio signal as an input and to generate an output (e.g. a feedback filter output) that causes the acoustic driver 1105 to attenuate the noise.

In the illustrated embodiment, both the reference internal noise microphone 1106 and the reference ambient noise microphone 1108 are approximately on-axis with the error noise microphone 1132. The axes of all three microphones 1106, 1108, 1132 are therefore aligned with one another. In this regard, a microphone's axis is the line that is perpendicular to the sound capturing diaphragm. The on-axis placement of the reference noise microphones 1106, 1108 with the error noise microphone 1132 is not essential but is preferable in order to increase the likelihood that any noise that reaches both a reference noise microphone 1106, 1108 and the error noise microphone 1132 is coherent. In the illustrated embodiment, the reference internal noise microphone 1106, the reference ambient noise microphone 1108 and the error noise sensor 1132 are also approximately on-axis with the acoustic driver 1105. All three microphones 1106, 1108, 1132 are therefore aligned with a central axis of the acoustic driver 1105. The on-axis placement of the reference noise 1106, 1108 and error noise microphones 1132 is not essential but is preferable in order to optimize the effectiveness of the ANC in dealing with exogenous noise that can arrive at the ear cup from any direction.

Figure 4A:
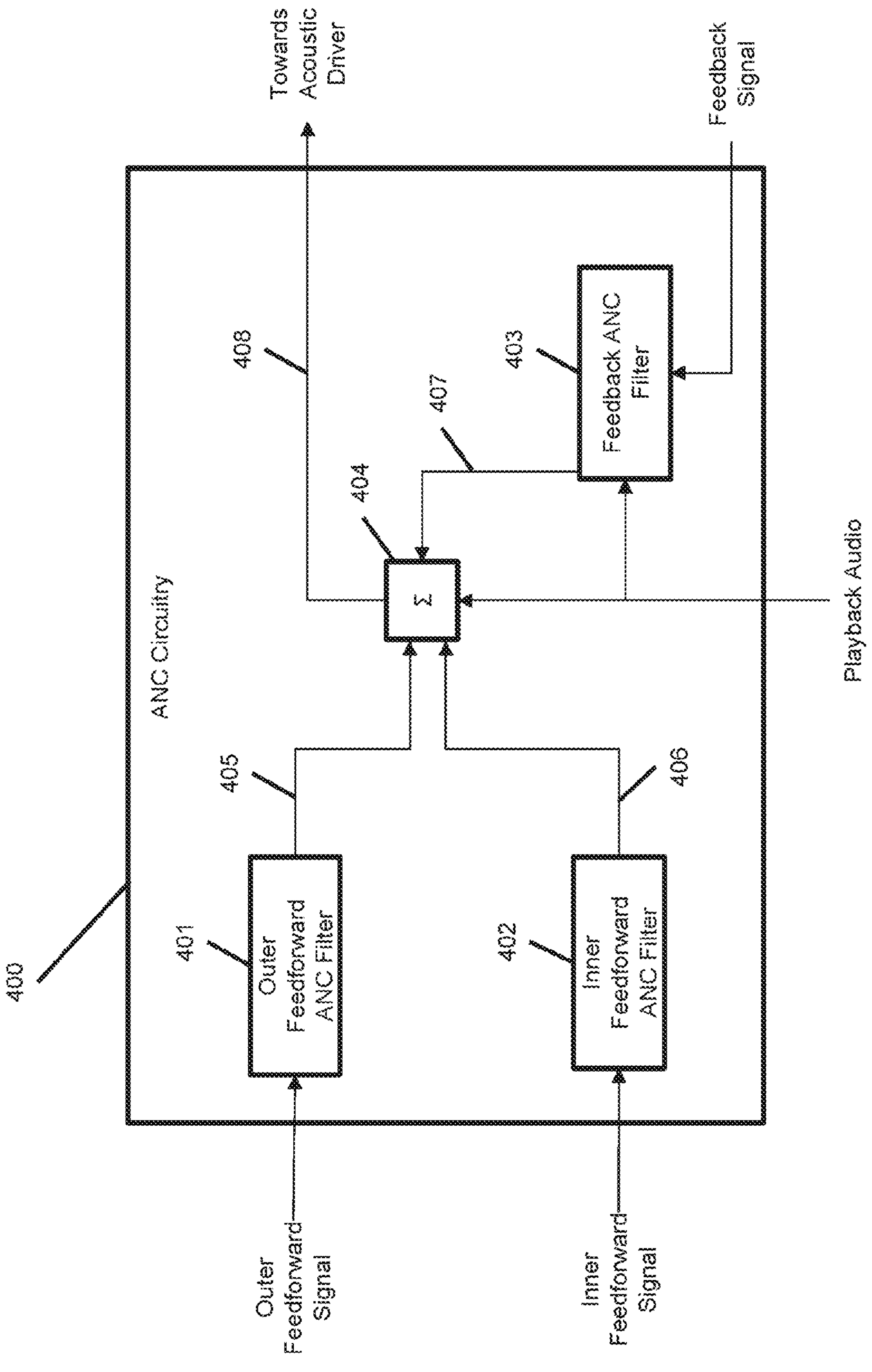

FIG. 4*a* illustrates schematically an example of ANC circuitry 400 suitable for use with the arrangements described herein. In this example, the ANC circuitry 400 is configured to implement an enhanced form of hybrid ANC that simultaneously uses the signals provided by each of the reference internal noise microphone, the reference ambient noise microphone and the error noise microphone to implement ANC. In the example of FIG. 4*a*, the ANC circuitry 400 comprises an outer feedforward ANC filter 401, an inner feedforward ANC filter 402, a feedback ANC filter 403 and a combiner 404. The reference ambient noise signal is provided to the ANC circuitry 400 by the conventional reference ambient noise microphone and is passed as an input to the outer feedforward ANC filter 401 that then generates an outer feedforward anti-noise output 405 using this signal. The reference internal noise signal is provided to the ANC circuitry 400 by the reference internal noise microphone and is passed as an input to the inner feedforward ANC filter 402 that then generates an inner feedforward anti-noise output 406 using this signal. The feedback signal is provided to the ANC circuitry 400 by the error noise sensor and is passed as an input to the feedback ANC filter 403 that then generates a feedback anti-noise output 407 using both this feedback signal and the desired audio signal. The outer feedforward ANC filter 401, the inner feedforward ANC filter 402 and the feedback ANC filter 403 are configured to operate simultaneously, with the anti-noise outputs of each filter then being summed together with the desired audio signal by the combiner 404 before being passed as an output audio signal 408 towards the acoustic driver.

Figure 4B:
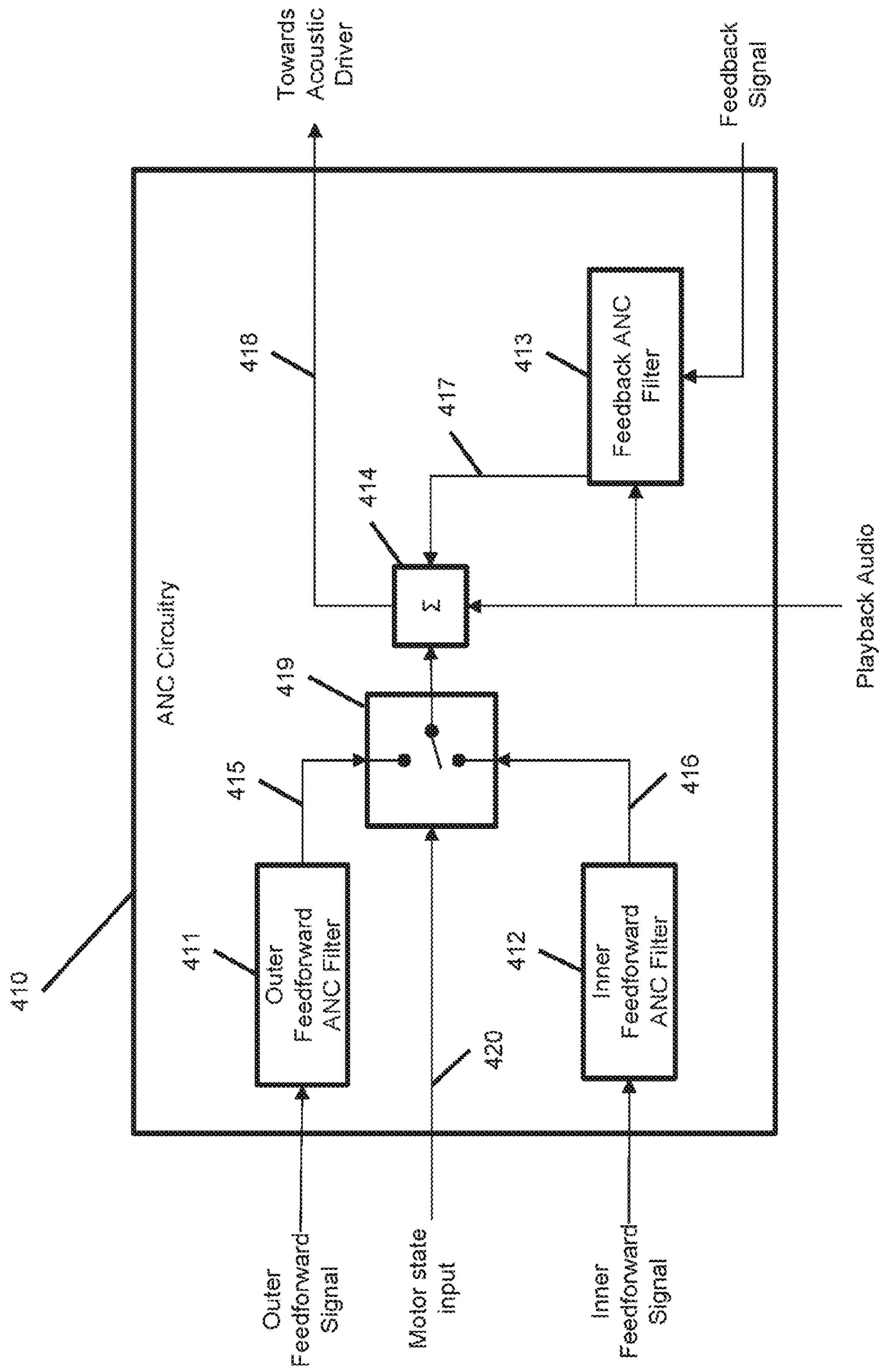

Whilst optimal performance is most likely achieved by simultaneous use of both the outer feedforward ANC and inner feedforward ANC systems, this approach requires significant modifications of conventional ANC circuitry, especially when combined with a feedback ANC system. FIG. 4*b* therefore illustrates schematically an alternative example of ANC circuitry 410 suitable for use with the arrangements described herein. In this example, the ANC circuitry 410 is configured to implement a form of hybrid ANC that switches between the outer feedforward ANC and inner feedforward ANC systems depending upon the state of the motor-drive impeller. In the example of FIG. 4*b*, the ANC circuitry 410 comprises an outer feedforward ANC filter 411, an inner feedforward ANC filter 412, a feedback ANC filter 413, a combiner 414 and a switch 419. The outer feedforward ANC filter 411, the inner feedforward ANC filter 412 and the feedback ANC filter 413 are configured to operate in essentially the same way as in the circuit of FIG. 4*a*. However, rather than providing their anti-noise outputs 415, 416, 417 directly to the combiner 414, the outer feedforward ANC filter 411 and the inner feedforward ANC filter 412 are instead arranged to provide their anti-noise outputs 415, 416 to the switch 419. The switch 419 is then configured to select one of these anti-noise outputs 415, 416 in dependence upon the state of the motor. Specifically, when the motor is in a first operating state, the switch 419 is configured to select the anti-noise output 416 provided by the inner feedforward ANC filter 412 and to provide this anti-noise output 416 to the combiner 414. Consequently, when the motor is in the first operating state, the anti-noise outputs 416, 417 of the inner feedforward ANC filter 412 and the feedback ANC filter 413 are summed together with the desired audio signal by the combiner 414 before being passed as an output audio signal 418 towards the acoustic driver. Conversely, when the motor is in a second operating state, the switch 419 is configured to select the anti-noise output 415 provided by the outer feedforward ANC filter 411 and to provide this anti-noise output 415 to the combiner 414. Consequently, when the motor is in the second operating state, the anti-noise outputs 415, 417 of the outer feedforward ANC filter 411 and the feedback ANC filter 413 are summed together with the desired audio signal by the combiner 414 before being passed as an output audio signal 418 towards the acoustic driver.

In order to implement this switching the ANC circuitry 410 is provided with an input 420 that is indicative of the state of the motor, with the switch 419 then being configured to select between the first operating state and the second operating state in response to changes in this input 420. For example, the switch 419 may be configured to select the first operating state when the input 420 provides a first control signal (e.g. a high) and to select the second operating state when the input 420 provides a second control signal (e.g. a low). The input 420 that is indicative of the state of the motor may be provided by the motor control circuitry that controls the rotational speed of the motor. The motor control circuitry may then be configured to send the first control signal to the ANC circuitry 410 when the rotational speed of the motor-driven impeller is above a threshold and to send the second control signal to the ANC circuitry 410 when the rotational speed of the motor-driven impeller is below this threshold. By way of example, the threshold rotational speed could be set to zero such that the ANC circuitry 410 enters the first operating state in response to the first control signal, and therefore makes use of the anti-noise output 416 provided by the inner feedforward ANC filter 412, as soon as the motor control circuitry turns on the motor. The ANC circuitry 410 would then enter the second operating state in response to the second control signal, and therefore make use of the anti-noise output 415 provided by the outer feedforward ANC filter 411, as soon as the motor control circuitry turns off the motor. As an alternative example, if it is considered that the noise generated by the motor-driven impeller at low speeds is not sufficient to justify using the inner feedforward ANC system, then the threshold rotational speed could be set to a non-zero value. The ANC circuitry 410 would then only enter the first operating state in response to the first control signal, and therefore make use of the anti-noise output 416 provided by the inner feedforward ANC filter 412, when the rotational speed of the motor is high enough to result in a level of noise that requires specific attenuation.

As an alternative to the example illustrated in FIG. 4*b*, the switched feedforward operation of the ANC could also be achieved using the ANC circuit 400 of FIG. 4*a*. To do so, rather than using the input 420 that is indicative of the state of the motor to switch between the anti-noise outputs of the outer feedforward ANC filter 411 and the inner feedforward ANC filter 412, this input 420 would be used to selectively switch off one of the outer feedforward ANC system and the inner feedforward ANC system. Switching off the microphone and/or the ANC filter of one of the outer feedforward ANC system and the inner feedforward ANC system provides that only one of these will provide a non-zero anti-noise output to the combiner.

Figure 5:
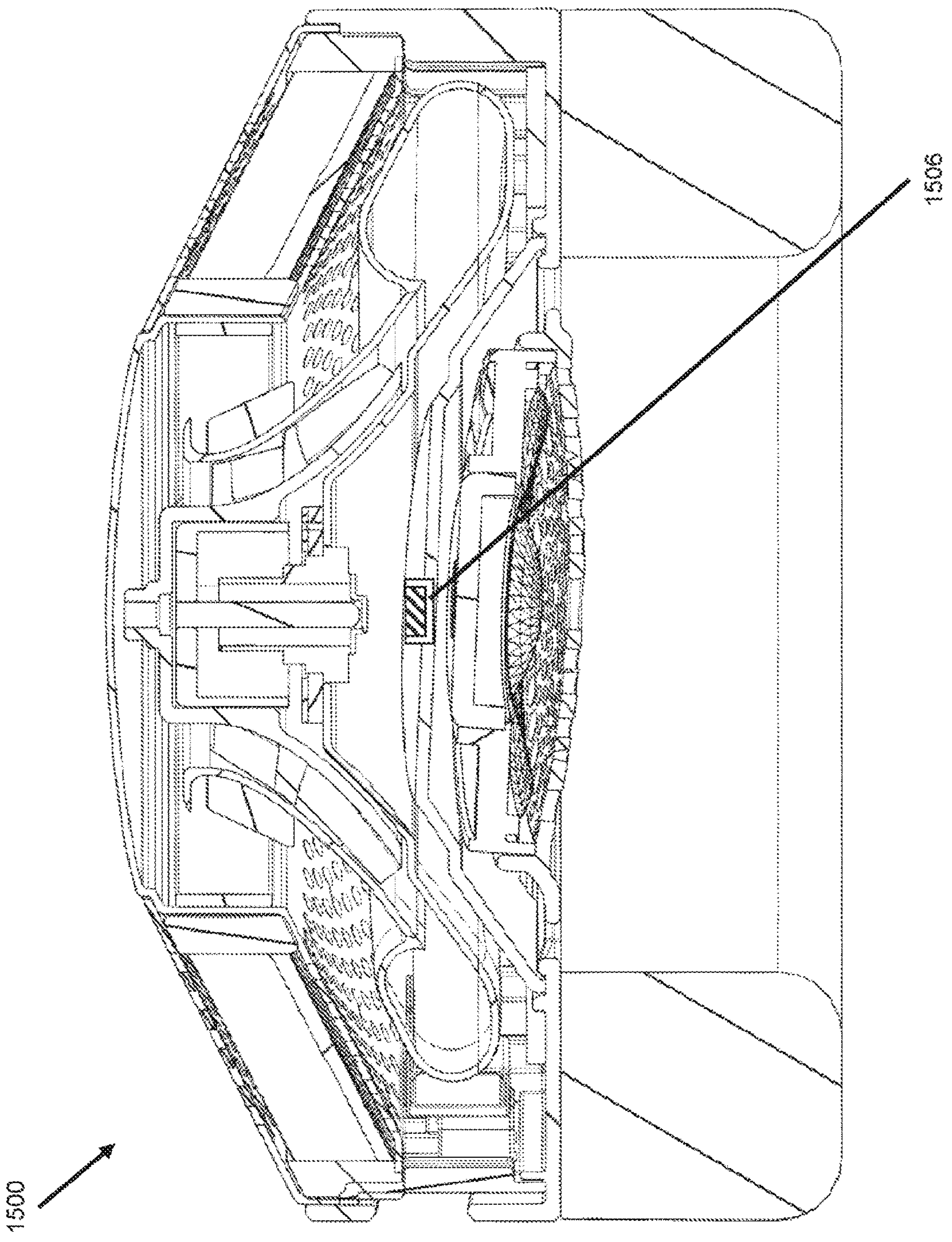
FIG. 5 is a cross-sectional view through a second example of an ear cup.
Figure 6:
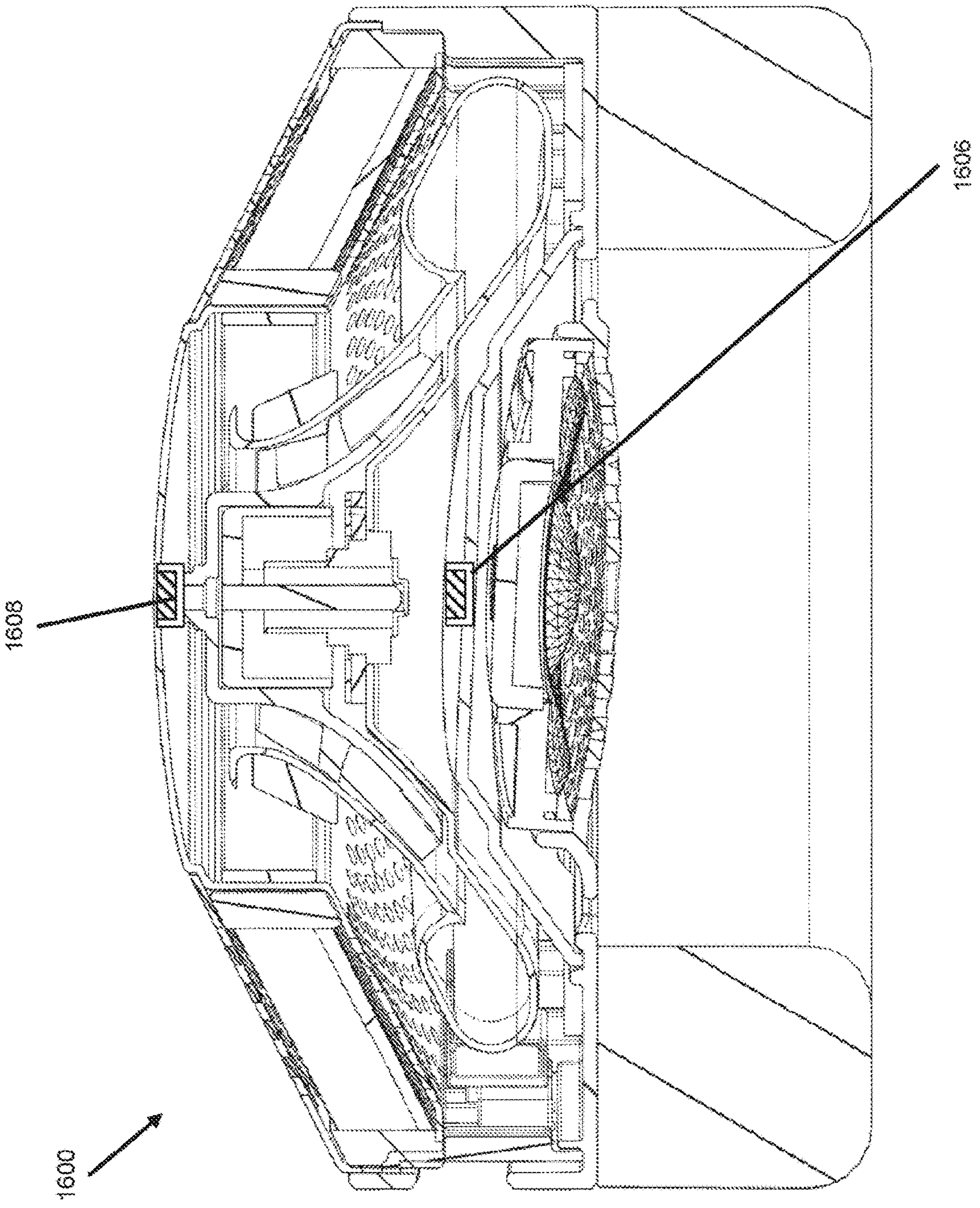
FIG. 6 is a cross-sectional view through a third example of an ear cup.
Figure 7:
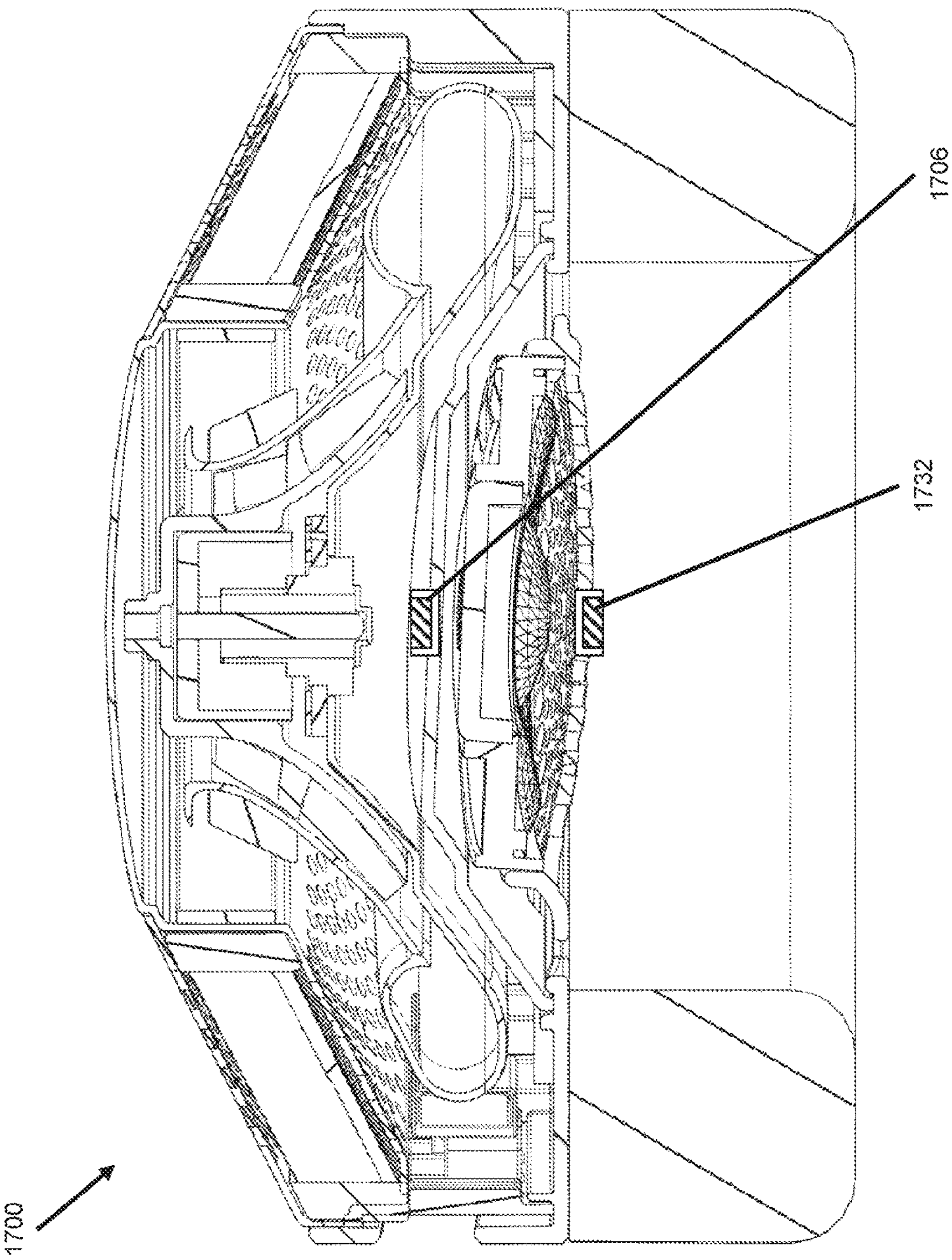
FIG. 7 is a cross-sectional view through a fourth example of an ear cup.

Whilst it is preferable that the ear cup described herein has a reference internal noise microphone, a reference ambient noise microphone and an error noise microphone, and therefore also has ANC circuitry that is configured to use the signals provided by each of these microphones, in simplified embodiments it may be desirable to make use of just a reference internal noise microphone, without either a reference ambient noise microphone or an error noise microphone. FIG. 5 therefore illustrates an example of such an embodiment in which the ear cup 1500 comprises a reference internal noise microphone 1506, and does not comprise either a reference ambient noise microphone or an error noise microphone. Such an embodiment would then rely on the reference internal noise microphone 1506 in combination with a corresponding inner feedforward ANC filter to attenuate noise. In alternative simplified embodiments, it may instead be desirable to make use of a reference internal noise microphone in combination with just one of a reference ambient noise microphone and an error noise microphone. FIGS. 6 and 7 therefore illustrate examples of each of these embodiments. Specifically, FIG. 6 illustrates an example of an embodiment in which the ear cup 1600 comprises a reference internal noise microphone 1606 and a reference ambient noise microphone 1608, and does not comprise an error noise microphone. Such an embodiment would then make use of the reference internal noise microphone 1606 in combination with an inner feedforward ANC filter and the reference ambient noise microphone 1608 in combination with an outer feedforward ANC filter to attenuate noise. FIG. 7 then illustrates an example of an embodiment in which the ear cup 1700 comprises a reference internal noise microphone 1706 and an error noise microphone 1732, and does not comprise a reference ambient noise microphone. Such an embodiment would then make use of the reference internal noise microphone 1706 in combination with an inner feedforward ANC filter and the error noise sensor 1732 in combination with a feedback ANC filter to attenuate noise.

It will be appreciated that individual items described above may be used on their own or in combination with other items shown in the drawings or described in the description and that items mentioned in the same passage as each other or the same drawing as each other need not be used in combination with each other. In addition, the expression "means" may be replaced by actuator or system or device as may be desirable. In addition, any reference to "comprising" or "consisting" is not intended to be limiting in any way whatsoever and the reader should interpret the description and claims accordingly.

Furthermore, although the invention has been described in terms of preferred embodiments as set forth above, it should be understood that these embodiments are illustrative only. Those skilled in the art will be able to make modifications and alternatives in view of the disclosure which are contemplated as falling within the scope of the appended claims. For example, in the above described embodiment the head wearable air purifier comprises a headphone system in which the two speaker assemblies are provided on opposite ends of a headband. However, the head wearable air purifier could equally comprise any head wearable article that could be used to support a first speaker assembly over a first ear of a user and a second speaker assembly over a second ear of the user. For example, the head wearable air purifier could comprise any type of headgear, such as a hat or a helmet, including safety hats and helmets, bicycle helmets, motorcycle helmets etc.

In addition, whilst in the above described embodiments both speaker assemblies include motor-driven impellers and filter assemblies, with both speaker assemblies then providing filtered/purified air to the nozzle, it is also possible that only one of the two speaker assemblies include a motor-driven impeller and a filter assembly, such that only a single speaker assembly then provides filtered/purified air to the nozzle. However, such an arrangement would not be as effective as those of the above described embodiments.

Moreover, whilst in the above described embodiments inner feedforward ANC system makes use of an inner feedforward microphone, the present inventors have recognised that the endogenous noise generated by the internal motor-driven impeller is mostly due to mechanical vibrations that are transferred through the structure of the ear cup and that the inner feedforward ANC system could therefore make use of a mechanical vibration sensor, such as an accelerometer, rather than a microphone. The inner feedforward sensor would then detect unwanted endogenous noise as mechanical vibrations rather than as sound. Whilst using a mechanical vibration sensor as the inner feedforward sensor would limit the effectiveness with which this sensor could detect other sources of noise (e.g. exogenous noise or airborne noise) it is potentially provides for greater freedom in locating the inner feedforward sensor with respect to the motor.

The invention claimed is:

1. An ear cup comprising:

a housing containing a filter assembly and a motor-driven impeller for creating an airflow through the filter assembly, the housing comprising an air outlet downstream from the filter assembly for emitting the filtered airflow from the housing;

an acoustic driver mounted to the housing;

a reference internal noise sensor disposed within the housing;

a reference ambient noise sensor mounted to the housing; and active noise control circuitry that is configured, in a first operating state, to use a signal provided by the reference internal noise sensor and not a signal provided by the reference ambient noise sensor to operate the acoustic driver and, in a second operating state, to use a signal provided by the reference ambient noise sensor and not a signal provided by the reference internal noise sensor to operate the acoustic driver.

2. The ear cup of claim 1, wherein the active noise control circuitry is configured to select the first operating state in response to receipt of a first control signal and to select the second operating state in response to a second control signal.

3. The ear cup of claim 1, wherein the reference internal noise sensor is disposed between the motor-driven impeller and the acoustic driver.

4. The ear cup of claim 3, wherein the impeller and a motor for driving the impeller are disposed within an impeller casing, and the impeller casing is disposed within the housing.

5. The ear cup of claim 4, wherein the reference internal noise sensor is disposed between the impeller casing and the acoustic driver.

6. The ear cup of claim 1, wherein the reference ambient noise sensor is acoustically coupled to an environment external to the housing.

7. The ear cup of claim 1, and further comprising an ear pad attached to the housing and arranged such that the housing and the ear pad together define a cavity having an opening.

8. The ear cup of claim 7, wherein the acoustic driver is acoustically coupled to the cavity.

9. A head wearable device comprising:

a headgear; and an ear cup as claimed in claim 1;

wherein the ear cup is attached to the headgear and is arranged to be worn over an ear of a user.

10. The head wearable device of claim 9, and further comprising a further ear cup arranged to be worn over a further ear of the user.

11. The head wearable device of claim 10, wherein the further ear cup comprises:

a second housing containing a second filter assembly and a second motor-driven impeller for creating an second airflow through the second filter assembly, the second housing comprising a second air outlet downstream from the second filter assembly for emitting the filtered second airflow from the second housing;

a second acoustic driver mounted to the second housing;

a second reference internal noise sensor disposed within the second housing:

a second reference ambient noise sensor mounted to the second housing; and second active noise control circuitry that is configured, in a first operating state, to use a signal provided by the second reference internal noise sensor to operate the second acoustic driver and, in a second operating state, to use a signal provided by the second reference ambient noise sensor to operate the second acoustic driver.

12. The head wearable device of claim 9, wherein the headgear comprises a headband arranged to be worn on the head of a user, and the ear cup is mounted on a first end of the headband and a further ear cup is mounted on an opposite, second end of the headband.

13. An ear cup comprising:

a housing containing a filter assembly and a motor-driven impeller for creating an airflow through the filter assembly, the housing comprising an air outlet downstream from the filter assembly for emitting the filtered airflow from the housing;

an acoustic driver mounted to the housing;

a reference internal noise sensor disposed within the housing;

a reference ambient noise sensor mounted to the housing;

active noise control circuitry that is configured, in a first operating state, to use a signal provided by the reference internal noise sensor to operate the acoustic driver and, in a second operating state, to use a signal provided by the reference ambient noise sensor to operate the acoustic driver; and motor control circuitry arranged to control a rotational speed of the motor-driven impeller, wherein the active noise control circuitry is configured to select the first operating state in response to receipt of a first control signal from the motor control circuitry and to select the second operating state in response to a second control signal from the motor control circuitry.

14. The ear cup of claim 13, wherein the motor control circuitry is configured to send the first control signal to the active noise control circuitry when the rotational speed of the motor-driven impeller is above a threshold.

15. The ear cup of claim 13, wherein the motor control circuitry is configured to send the second control signal to the active noise control circuitry when the rotational speed of the motor-driven impeller is below a threshold.

16. A head wearable device comprising:

a headgear; and an ear cup as claimed in claim 3;

wherein the ear cup is attached to the headgear and is arranged to be worn over an ear of a user.

17. The head wearable device of claim 16, and further comprising a further ear cup arranged to be worn over a further ear of the user.

18. An ear cup comprising:

a housing containing a filter assembly and a motor-driven impeller for creating an airflow through the filter assembly, the housing comprising an air outlet downstream from the filter assembly for emitting the filtered airflow from the housing;

an ear pad attached to the housing and arranged such that the housing and the ear pad together define a cavity having an opening;

an acoustic driver mounted to the housing;

a reference internal noise sensor disposed within the housing between the motor-driven impeller and the acoustic driver;

a reference ambient noise sensor mounted to the housing;

active noise control circuitry that is configured, in a first operating state, to use a signal provided by the reference internal noise sensor to operate the acoustic driver and, in a second operating state, to use a signal provided by the reference ambient noise sensor to operate the acoustic driver; and an error noise sensor that is disposed within the cavity, wherein the active noise control circuitry is further configured to use a signal provided by the error noise sensor to operate the acoustic driver.

19. The ear cup of claim 18, wherein the reference internal noise sensor is on-axis with the error noise sensor.

20. A head wearable device comprising:

a headgear; and an ear cup as claimed in claim 18;

wherein the ear cup is attached to the headgear and is arranged to be worn over an ear of a user.

* * * * *